United States Patent
Yokev et al.

(10) Patent No.: US 11,105,912 B2
(45) Date of Patent: Aug. 31, 2021

(54) COHERENT WI-FI RADAR USING WIRELESS ACCESS POINT

(71) Applicant: CELENO COMMUNICATIONS (ISRAEL) LTD., Raanana (IL)

(72) Inventors: Hanoch Yokev, Kiryat Tivon (IL); Albert Rapaport, Shoham (IL)

(73) Assignee: CELENO COMMUNICATIONS (ISRAEL) LTD., Raanana (IL)

( * ) Notice: Subject to any disclaimer, the term of this patent is extended or adjusted under 35 U.S.C. 154(b) by 89 days.

(21) Appl. No.: 16/726,986

(22) Filed: Dec. 26, 2019

(65) Prior Publication Data
US 2020/0209378 A1    Jul. 2, 2020

Related U.S. Application Data

(60) Provisional application No. 62/786,579, filed on Dec. 31, 2018.

(51) Int. Cl.
*G01S 13/12* (2006.01)
*H04W 72/12* (2009.01)
(Continued)

(52) U.S. Cl.
CPC .............. *G01S 13/12* (2013.01); *H04L 5/005* (2013.01); *H04W 52/0216* (2013.01);
(Continued)

(58) Field of Classification Search
CPC .............. G01S 13/12; H04W 72/1215; H04W 56/0045; H04W 84/12; H04L 5/005
See application file for complete search history.

(56) References Cited

U.S. PATENT DOCUMENTS

| 7,054,296 B1 | 5/2006 | Sorells et al. |
| 7,072,390 B1 | 7/2006 | Sorells et al. |

(Continued)

FOREIGN PATENT DOCUMENTS

| CN | 103308934 A | 9/2013 |
| EP | 2696332 A1 | 2/2014 |

(Continued)

OTHER PUBLICATIONS

International Application # PCT/IB2019/061355 search report dated Mar. 18, 2020.

(Continued)

*Primary Examiner* — Mohammad S Anwar
(74) *Attorney, Agent, or Firm* — Kligler & Associates Patent Attorneys Ltd

(57) ABSTRACT

A Wireless Local-Area Network (WLAN) access point includes a WLAN transmitter, a WLAN receiver, and a processor. The WLAN transmitter is configured to transmit WLAN packets and to send a timing-synchronization signal. The WLAN receiver is configured to receive echo packets including reflections from an object of the transmitted WLAN packets, to receive the timing-synchronization signal, and to time-synchronize the echo packets and the corresponding WLAN packets. The processor is configured to (a) in response to a gap in the received echo packets, generate one or more synthetic echo packets by interpolating over two or more of the time-synchronized received echo packets, to consequently derive a sequence of equally-spaced echo packets, (b) using the derived sequence of equally-spaced echo packets and the WLAN packets estimate one or more parameters of the object, and (c) output the estimated parameters to a user.

18 Claims, 4 Drawing Sheets

(51) Int. Cl.
  *H04W 56/00* (2009.01)
  *H04L 5/00* (2006.01)
  *H04W 84/12* (2009.01)
  *H04W 88/08* (2009.01)
  *H04W 52/02* (2009.01)
  *H04W 88/06* (2009.01)

(52) U.S. Cl.
  CPC ... *H04W 56/0045* (2013.01); *H04W 72/1215* (2013.01); *H04W 84/12* (2013.01); *H04W 88/06* (2013.01); *H04W 88/08* (2013.01)

(56) References Cited

U.S. PATENT DOCUMENTS

| | | | |
|---|---|---|---|
| 8,737,279 | B1 | 5/2014 | Aweya et al. |
| 8,897,152 | B1 | 11/2014 | Caceres et al. |
| 9,474,041 | B1 | 10/2016 | Zhang et al. |
| 9,686,164 | B1 | 6/2017 | Paczkowski et al. |
| 9,971,414 | B2 | 5/2018 | Gollakota et al. |
| 10,031,209 | B2 | 7/2018 | Sen et al. |
| 2006/0109780 | A1* | 5/2006 | Fechtel ............... H04L 5/06 370/203 |
| 2009/0022157 | A1 | 1/2009 | Rumbaugh et al. |
| 2010/0130873 | A1 | 5/2010 | Yuen et al. |
| 2011/0287778 | A1* | 11/2011 | Levin ............... H04W 64/006 455/456.1 |
| 2014/0187259 | A1 | 7/2014 | Kakani et al. |
| 2015/0270867 | A1* | 9/2015 | Young ............... H04B 1/7085 375/145 |
| 2016/0044695 | A1 | 2/2016 | Gunner |
| 2016/0259041 | A1* | 9/2016 | Tan ............... G01S 13/003 |
| 2017/0034507 | A1 | 2/2017 | Harris et al. |
| 2017/0086202 | A1* | 3/2017 | Chen ............... G01S 7/006 |
| 2017/0188227 | A1 | 6/2017 | Kang |
| 2017/0212210 | A1 | 7/2017 | Chen et al. |
| 2018/0081030 | A1 | 3/2018 | McMahon et al. |
| 2018/0115439 | A1 | 4/2018 | Bhatti et al. |
| 2018/0121226 | A1 | 5/2018 | Liu |
| 2019/0120952 | A1 | 4/2019 | Kim |
| 2020/0229126 | A1 | 7/2020 | Soriaga et al. |
| 2020/0333472 | A1 | 10/2020 | Marshall et al. |

FOREIGN PATENT DOCUMENTS

| | | |
|---|---|---|
| WO | 2016065368 A1 | 4/2016 |
| WO | 2018222268 A1 | 12/2018 |

OTHER PUBLICATIONS

International Application # PCT/IB2019/061374 search report dated Apr. 27, 2020.
Banin et al., "Reference Positioning Engine & Measurements Database for Wi-Fi RTT (FTM) Positioning", Intel Corporation, pp. 1-13, Aug. 1, 2018.
Gunther et al., "Measuring Round Trip Times to Determine the Distance between WLAN Nodes", International Conference on Research in Networking, pp. 768-779 , May 2, 2005.
Chen et al., "Doppler Based Detection of Multiple Targets in Passive Wi-Fi Radar Using Underdetermined Blind Source Separation", International Conference on Radar (RADAR), pp. 1-6, Aug. 27, 2018.
Chabriel et al., "Passive Covert Radars using CP-OFDM signals. A new efficient method to extract targets echoes", International Conference on Radar (RADAR), pp. 1-6, Oct. 13, 2014.
Huang et al., "Feasibility and Limits of Wi-Fi Imaging", SenSys '14: Proceedings of the 12th ACM Conference on Embedded Network Sensor System, pp. 266-279, Nov. 3, 2014.
U.S. Appl. No. 16/550,232 Office Action dated Nov. 4, 2020.
U.S. Appl. No. 16/726,853 Office Action dated Feb. 2, 2021.
IEEE P802.11ax™/D2.3, Draft Standard for Information technology—Telecommunications and information exchange between systems Local and metropolitan area networks—Specific requirements, Part 11: Wireless LAN Medium Access Control (MAC) and Physical Layer (PHY) Specifications, Amendment 6: Enhancements for High Efficiency WLAN, IEEE Computer Society, pp. 1-660, Apr. 2018.
Rs et al., "Design of Inverse Moving Target Indicator (IMTI) algorithm for arbitrary filter weights", 9th International Radar Symposium India—(IRSI-13), pp. 1-4, Dec. 10-14, 2013.
Gurbuz et al., "Radar Detection and Identification of human Signatures using Moving Platforms", Thesis in partial fulfillment of the requirements for the Degree Doctor of Philosophy of Philosophy in the School of Electrical and Computer Engineering, Georgia Institute of Technology, pp. 1-127, Dec. 2009.
Sit, "MIMO OFDM Radar-Communication System with Mutual Interference Cancellation", KIT Scientific Publishing, pp. 1-262, year 2017.
Kim et al., "Human Detection and Activity Classification Based on Micro-Doppler Signatures Using Deep Convolutional Neural Networks", IEEE Geoscience and Remote Sensing Letters, vol. 13, No. 1, pp. 8-12, Jan. 2016.
Cao, "A CFAR Algorithm for Radar Detection Under Severe Interference", Proceedings of the 2004 Intelligent Sensors, Sensor Networks and Information Processing Conference, pp. 167-172, Dec. 14-17, 2004.
Scharf et al., U.S. Appl. No. 16/550,232, filed Aug. 25, 2019.
International Application # PCT/IB2019/057132 search report dated Dec. 4, 2019.
Sabay, U.S. Appl. No. 16/726,853, filed Dec. 25, 2019.

* cited by examiner

COHERENT WI-FI RADAR USING WIRELESS ACCESS POINT

CROSS-REFERENCE TO RELATED APPLICATIONS

This application claims the benefit of U.S. Provisional Patent Application 62/786,579, filed Dec. 31, 2018, whose disclosure is incorporated herein by reference.

TECHNICAL FIELD

Embodiments described herein relate generally to wireless networks, and particularly to devices and methods for wireless detection of physical objects within a wireless network environment.

BACKGROUND

Techniques that utilize wireless communication signals to identify human motion based on reflection of the wireless signals from the human body were previously proposed in the patent literature. For example, PCT Patent Application Publication WO2018/222268 describes techniques and apparatuses that enable radar modulations for radar sensing using a wireless communication chipset. A controller initializes or controls modulations performed by the wireless communication chipset. In this way, the controller can enable the wireless communication chipset to perform modulations for wireless communication or radar sensing. In some cases, the controller can further select a wireless communication channel for setting a frequency and a bandwidth of a radar signal, thereby avoiding interference between multiple radar signals or between the radar signal and a communication signal. In other cases, the controller can cause the wireless communication chipset to modulate a signal containing communication data using a radar modulation. This enables another device that receives the signal to perform wireless communication or radar sensing. By utilizing these techniques, the wireless communication chipset can be used for wireless communication or radar sensing.

SUMMARY

An embodiment of the present invention provides a Wireless Local-Area Network (WLAN) access point, including a WLAN transmitter, a WLAN receiver, and a processor. The WLAN transmitter is configured to transmit WLAN packets via one or more transmit antennas, and to send a timing-synchronization signal over an internal interface. The WLAN receiver is configured to receive, via one or more receive antennas, echo packets including reflections from an object of a selected subset of the WLAN packets transmitted by the WLAN transmitter, to receive the timing-synchronization signal from the WLAN transmitter over the internal interface, and to time-synchronize the echo packets and the corresponding WLAN packets using the timing-synchronization signal. The a processor is configured to (a) in response to a gap in the received echo packets, generate one or more synthetic echo packets by interpolating over two or more of the time-synchronized received echo packets, to consequently derive a sequence of equally-spaced echo packets, (b) estimate one or more parameters of the object based on the WLAN packets and on the sequence of equally-spaced echo packets, including the received echo packets and the synthetic echo packets, (c) and output the estimated parameters to a user.

In some embodiments, the processor is configured to generate a synthetic echo packet by (i) assigning the two or more received echo packets respective weights depending on a time difference between the two or more received echo packets and the synthetic echo packet, and (ii) interpolating over the two or more weighted received echo packets.

In some embodiments, the processor is configured to interpolate over the received echo packets by interpolating over measured net delay times between the sent WLAN packets and the respective received echo packets.

In an embodiment, the processor is configured to estimate a distance between the access point and the object by (a) for a given WLAN packet transmitted by the WLAN transmitter, identifying (i) an echo packet received from the target in response to the given WLAN packet, and (ii) a direct leakage of the given WLAN packet from the WLAN transmitter to the WLAN receiver, (b) measuring a time delay between the echo packet and the direct leakage, and (c) estimating the distance based on the time delay.

In another embodiment, the access further includes a frequency source configured to generate at least one frequency-reference signal, and to provide the frequency-reference signal to both the WLAN transmitter and the WLAN receiver, wherein the WLAN transmitter and the WLAN receiver are configured to frequency-synchronize to one another using the frequency-reference signal.

In some embodiments, the WLAN packets transmitted by the WLAN transmitter include both communication packets and channel-sounding packets, and the processor is configured to estimate the parameters of the object based on the echo packets corresponding to the channel-sounding packets.

In some embodiments, the access point further includes a frequency source configured to generate at least one frequency-reference signal, and to provide the frequency-reference signal to both the WLAN transmitter and the WLAN receiver, wherein the WLAN transmitter and the WLAN receiver are configured to frequency-synchronize to one another using the frequency-reference signal.

In an embodiment, the WLAN packets transmitted by the WLAN transmitter include both communication packets and channel-sounding packets, and the processor is configured to estimate the parameters of the object based on the echo packets corresponding to the channel-sounding packets. the WLAN receiver is configured to receive echo packets interleaved between WLAN communication packets received from one or more WLAN stations (STAs).

In another embodiment, the one or more parameters of the object include at least one parameter of the object, selected from the group of parameters consisting of range, direction and velocity. In some embodiments, the one or more parameters include a Doppler frequency shift of the object.

There is additionally provided, in accordance with another embodiment, a method for communication in a Wireless Local-Area Network (WLAN) access point, the method including, in a WLAN transmitter of the access point, transmitting WLAN packets via one or more transmit antennas, and sending a timing-synchronization signal over an internal interface. Echo packets are received in a WLAN receiver of the access point, which include reflections from an object of a selected subset of the WLAN packets transmitted by the WLAN transmitter and the timing-synchronization signal. The echo packets and the corresponding WLAN packets are time-synchronized using the timing-synchronization signal. In a processor of the access point, in response to a gap in the received echo packets, one or more synthetic echo packets are generated by interpolating over two or more of the time-synchronized received echo packets, to consequently derive a sequence of equally-spaced echo packets. One or more parameters of the object are estimated based on the WLAN packets and on the sequence of equally-spaced echo packets, including the received echo packets and the synthetic echo packets. The estimated parameters are outputted to a user.

The present invention will be more fully understood from the following detailed description of the embodiments thereof, taken together with the drawings in which:

DETAILED DESCRIPTION OF EMBODIMENTS

Overview

Figure 1:
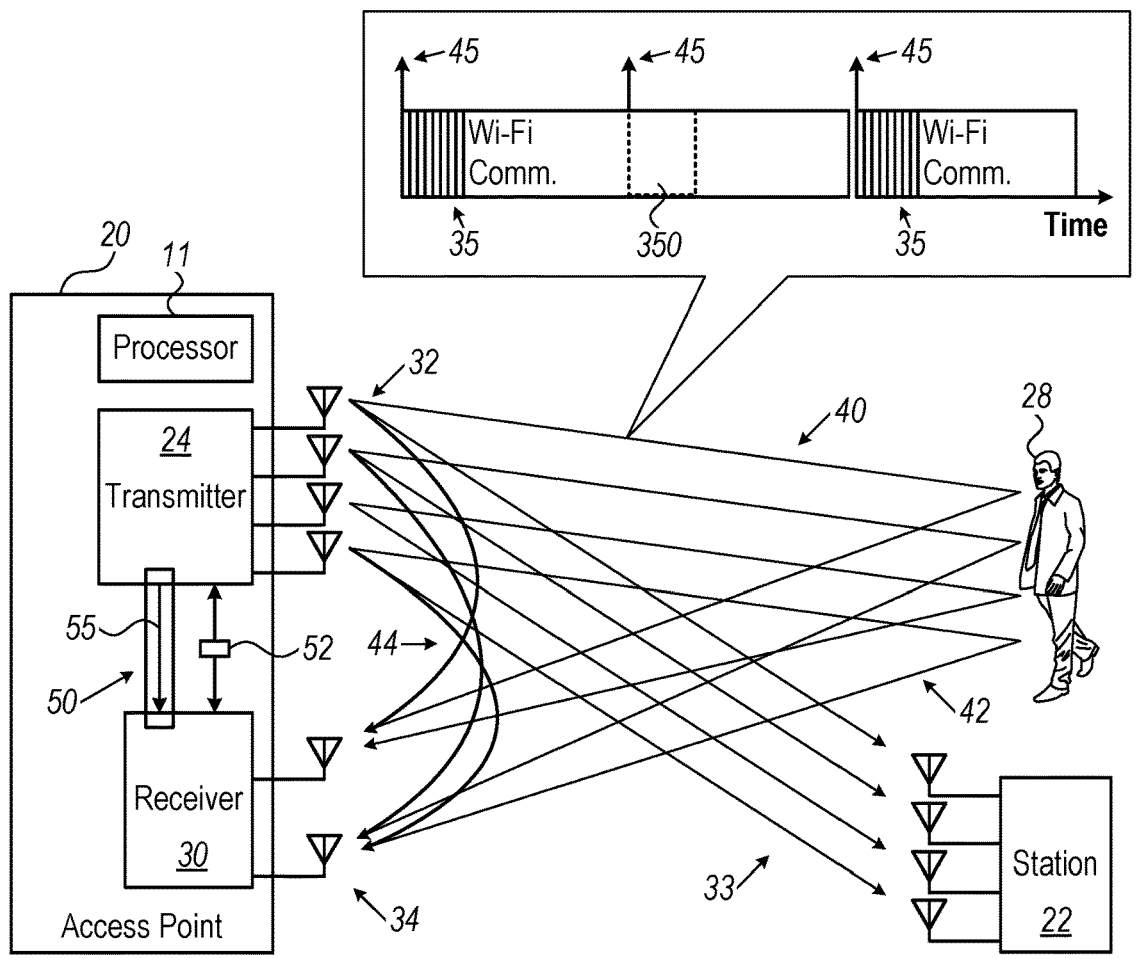
FIG. 1 is a block diagram that schematically illustrates a wireless access point (AP) that is further configured as a Wi-Fi radar, in accordance with an embodiment that is described herein.

An access point (AP) is a device that creates a wireless local area network (WLAN) in a designated area, such as inside a building. An AP typically transmits and receives wireless communication signals to and from WLAN stations (e.g., smartphones, laptops) in the designated area. A common communication standard in use with APs is the IEEE 802.11 standard family for Wi-Fi communication, which typically use radio frequencies between 1 GHz and 10 GHz.

Embodiments of the present invention that are described herein provide improved AP devices that, on top of their standard use, function as Wi-Fi radars to detect location and movements of physical objects, such as a human subject, within a designated area (i.e., in the surroundings of the AP). During such use, the AP performs channel estimation (estimation of the channel response, typically for estimation of communication quality) for the extra AP functionality of radar detection.

In radar mode, the disclosed AP devices transmit sequences of Wi-Fi channel-sounding packets, e.g., Null Data Packets (NDPs) such as 802.11AX NDP packets, and receive respective sequences of NDPs, also named hereinafter "echoes," that are physically reflected or scattered by objects in the designated area. To estimate a range (i.e., a distance) from the AP to a target that causes the echoes, the APs may estimate a time delay between each transmitted packet and a respectively received echo packet. The embodiments described herein refer mainly to NDPs by way of example. Generally, however, any other suitable type of WLAN packets, channel-sounding packets or otherwise, can be used for radar processing.

An echo can result from a human and/or from objects such as walls, doors, and others. Humans are considered a difficult target to detect because they have a small radar cross section (RCS) and may easily be masked by surroundings that possess a higher RCS. To distinguish humans from their surroundings, the radar sensing may apply the Doppler effect. Human motion typically generates very low Doppler shifts (also termed hereinafter "micro-Doppler signatures"), in the range of a few tens to several hundreds of hertz. Thus, humans often fall below the minimum detectable velocity in Doppler processing.

Doppler estimation is based on identifying a frequency component (e.g., a sine wave) frequency undergoing a Doppler shift $f_D$ (e.g., using FFT or phase difference) of the object's echo estimated taps over time (i.e., frequency shifts of echoes of NDP packets sent over time). To estimate properly the this doppler frequency using FFT (or other technique) it is required to have the echo tap estimation values equally timed spaced. Therefore, to identify human movement, the disclosed AP devices should transmit NDPs that are equally-spaced in time, i.e., at regular time intervals, which have their respective echoes spectrally analyzed to extract a Doppler signature.

In some cases, however, transmission of an equally-spaced NDPs is not possible. For example, assuming the AP gives precedence to communication packets over radar-related packets, communication load may result in "gaps" during which NDP packets cannot be sent. The resulting lack of equal time spacing in the respective echo sequence may prevent the AP from extracting a Doppler signature. This effect may result in temporary loss of radar sensing of moving targets, and furthermore loss of an identity of a moving target, such as of a selected moving target among several moving targets.

Embodiments of the present invention that are described hereinafter overcome such potential temporary loss of Wi-fi radar sensing, by reconstructing missing echo packets by interpolating between available echo packets. The interpolation generates the equally timed spaced echo tap estimation values required. For the sake of clarity, the description that follows assumes that gaps in the NDP sequence are caused by high communication load and thus unavailability of the channel. Generally, however, gaps in the sequence of NDP packets may occur for various other reasons, and the disclosed techniques are applicable in any such scenario.

This way, instead of discarding an entire sequence of echoes due to one or more missing echoes, the sequence is filled using interpolation and subsequently analyzed, and this way a temporal gap in n availability of radar sensing is avoided.

The disclosed method relies on an assumption that the physical parameters being detected change slowly and continuously over the periods of interrupted sensing. Therefore, interpolated values (e.g., weighted means of parameters of the received echo packets) are good approximations to missing data points in the sequence. As repetition rates are very high (e.g., 1 kHz) compared to typical Doppler shifts of sensed objects (e.g., moving humans), this approximation can be considered very good.

In some embodiments, a disclosed WLAN AP comprises a WLAN transmitter, a WLAN receiver and a processor. The WLAN transmitter is configured to transmit WLAN packets via one or more transmit antennas, and to send a timing-synchronization signal to the WLAN receiver over an internal interface. The WLAN receiver is configured to receive, via one or more receive antennas, echo packets comprising reflections from an object of a selected subset of the WLAN packets transmitted by the WLAN transmitter, to receive the timing-synchronization signal from the WLAN transmitter over the internal interface, and to time-synchronize the echo packets and the corresponding WLAN packets using the timing-synchronization signal. The processor is configured, in response to a gap in the received echo packets, to generate one or more synthetic echo packets by interpolating over two or more of the time-synchronized received echo packets, so as to derive a sequence of equally-spaced echo packets, to estimate one or more parameters of the object based on the WLAN packets and on the sequence of equally-spaced echo packets, including the received echo packets and the synthetic echo packets, and to output the estimated parameters to a user.

Typically, the processor in the AP is programmed in software containing a particular algorithm that enables the processor to conduct each of the processor-related steps and functions outlined above.

The disclosed techniques provide APs with physical monitoring capabilities using WLAN signals on top of their traditional usage in WLAN applications, including in dense communication situations, in which radar sensing is incomplete, which might have otherwise practically result in limited use of an AP for radar sensing.

System Description

FIG. 1 is a block diagram that schematically illustrates a wireless communication access point (AP) 20 that is further configured as a Wi-Fi radar, in accordance with an embodiment that is described herein. In the present example, AP 20 operates in accordance with an IEEE Standard of the 802.11 family. As seen, AP device 20 communicates with one or more stations (STA), such as STA 22. STA 22 is also commonly referred to as a "user device" or a "client device."

AP 20 comprises one or more transmit antennas 32 and one or more receive antennas 34. The transmit antennas and receive antennas may be the same, or different, antennas. Antennas 32 are sometimes referred to as a beamforming array, although the beamforming operation is typically performed on the signals that are provided to the antennas. In the downlink direction, the AP typically transmits one or more beam-formed data transmissions, referred to as data streams, on directional transmission beams 33 that are directed toward the STA(s) intended to receive the data streams. The data streams are also referred to as "spatial streams" and may be provided to the AP by an external host computer (not shown) or generated internally within AP 20.

In order to transmit a data stream to a given STA, AP 20 generates a corresponding signal for simultaneous transmission via multiple antennas 32. AP 20 comprises a WLAN transmitter 24 comprising a beamforming module (not shown) that applies, to the signal, a respective (complex valued) weight per each transmit antenna. The set of weights is selected so as to produce a directional transmission beam 33 that is directed, for example, toward the STA.

In the uplink direction, AP 20 receives via antennas 32, in a WLAN receiver 30, uplink transmissions (not shown) from one or more client devices, such as STA 22, and extracts information sent from the client devices to the AP.

In radar mode, WLAN receiver 30 receives echoes 42 of transmission beams 40, also termed hereinafter "echo taps." An echo tap has a time delay due to the accumulated propagation duration of beam 40 to human 28 and of its echo 42 back to the receiver. In order to perform Wi-Fi radar detection, WLAN transmitter 24 and WLAN receiver 30 are synchronized in time by a timing-synchronization signal: at the beginning of each transmission of an NDP packet 35 (seen in inset 25), WLAN transmitter 24 sends a timing-synchronization signal 45 to WLAN receiver 30 of AP 20. The timing-synchronization signal is applied by a synchronization circuitry 50 over an electrical interface 55.

In an embodiment, the WLAN transmitter is configured to transmit the channel-sounding packets interleaved between the communication packets, and the WLAN receiver is configured to receive echo packets interleaved between WLAN communication packets received from one or more WLAN stations (STAs). Therefore, as further seen in an inset at the top of the figure, NDP packets 35 are sent by WLAN transmitter 30 only when allowed by the regular communication stream load, i.e., sent between sequences carrying WLAN communication. As a result of the priority given to communication packets, there could be missing NDP packets of the NDP packets sent for radar sensing, such as a packet 350 missing from the sequence of NDP packets. As a result, the respective sequence of echoes cannot be fully analyzed (e.g., spectrally analyzed) for radar sensing. As described in FIG. 4 below, processor 11 is configured to overcome this problem by performing interpolation over measured echo packets to synthetically generate approximate echo packets that are missing, hence enabling full analysis, also described below, which is required for radar sensing.

Typically, WLAN transmitter 30 of AP 20 transmits NDP sequences 35 without beamforming for the purpose of channel estimation, and therefore NDP sequences 35 are transmitted more or less omnidirectionally. Alternatively, however, AP 20 may send NDP packets in a preferred direction, or angular sector, using spatial expansion matrix that performs nulling to AP 20 nearby receive antennas. For example, beamforming (BF) NDP packets may be used to achieve stronger reflection signal from a target object. NDP sequences 35 and the respective sequences of echoes (not shown) are analyzed by a processor 11 of AP 20 for performing radar detection of a human 28.

Using channel impulse response (CIR) characterization, a delay between a timing of a measured leakage tap 44 and a measured echo tap produced by human 28 is used by processor 11 to estimate the distance of human 28 from AP 20. The ability of AP 20 to detect and analyze echo 42 is a prerequisite to estimate a range to human 28 and depends on the capability of AP 20 to identify micro-Doppler signatures of human 28.

As noted above, detection of micro-Doppler shifts requires zero drift and/or jitter between RF carrier frequencies of WLAN transmitter 24 and WLAN receiver 30. The zero drift and/or jitter in RF frequency is achieved using a single source of RF carrier frequency, embodied by a circuitry 52, that simultaneously drives the two circuitries with synchronized RF clock signals. Typically, circuitry 52 is realized using a single Voltage-Controlled Crystal Oscillator (VCXO) local oscillator (LO).

In some embodiments, the disclosed Wi-Fi radar is based on dual-band capabilities of AP 20 (i.e., capability to transmit and receive packets at two different carrier frequencies), which includes two transceivers in parallel, each comprising a WLAN transmitter and a WLAN receiver, such as WLAN transmitter 24 and WLAN receiver 30. For example, a first transceiver operates at a nominal carrier frequency of 5.5 GHz, while a second transceiver operates at a nominal carrier frequency of 2.4 GHz, with the two transceivers having a bandwidth of up to 160 MHz.

In some embodiments, using HE-LTF type NDP packets, WLAN receiver 30 estimates a Multiple-Input Multiple-Output (MIMO) N×N (e.g., 4×4=16 elements) channel configuration between a set of transmit and receive antennas of AP 20. A full rank wireless channel estimation is performed, mainly for a beamforming precoding MIMO matrix generation process. A MIMO CIR is estimated by WLAN receiver 30 for every NDP transmission to track movement of a target object and to estimate its Doppler shift. In some embodiments, in addition to NDP packets, data packets sent for other stations can be further used for sensing (since, for example, the AP is sending LTF signals that are used for channel estimation in every NDP and data packet) to estimate the respective echoes and derive the human position.

Thus, MIMO is used for estimation of a direction and also for improving angular resolving power to separate between targets. The angular separation between targets improves with a larger product M×N of transmission and receiving channels. MIMO is also used to improve the tracking estimation of a target object and its Doppler shift estimate. Using MIMO gives an effect of SNR enhancement.

Using the HE-LTF NDP packet type, WLAN transmitter 24 provides training signals for a MIMO channel matrix per each carrier frequency used (e.g., 5.1 GHz and 5.9 GHz of a dual band AP 20), between all transmit and all receive circuitries, in order to enable channel estimation at all carrier frequencies used.

In an embodiment, in order to minimize the leakage signal (e.g., to nullify leakage signal), hence reducing dynamic range requirements from the receive circuitry of the AP, a special antenna arrangement may be applied. In the disclosed antenna arrangement, the transmitting antennas are placed below the receiving antennas at the edges of the AP in order to maximize the distance between them. The antennas are designed to have minimal gain at the elevation angles around right angles on both the transmitter and the receiver elevations in order to reduce the transmitted and received leakage.

Further aspects of APs that also perform Wi-Fi radar processing are described in U.S. patent application Ser. No. 16/550,232, filed Aug. 25, 2019, entitled "Wi-Fi Radar Sensing," which is assigned to the assignee of the present patent application and whose disclosure is incorporated herein by reference.

Wi-Fi Radar Synchronization Hardware Solutions

Figure 2:
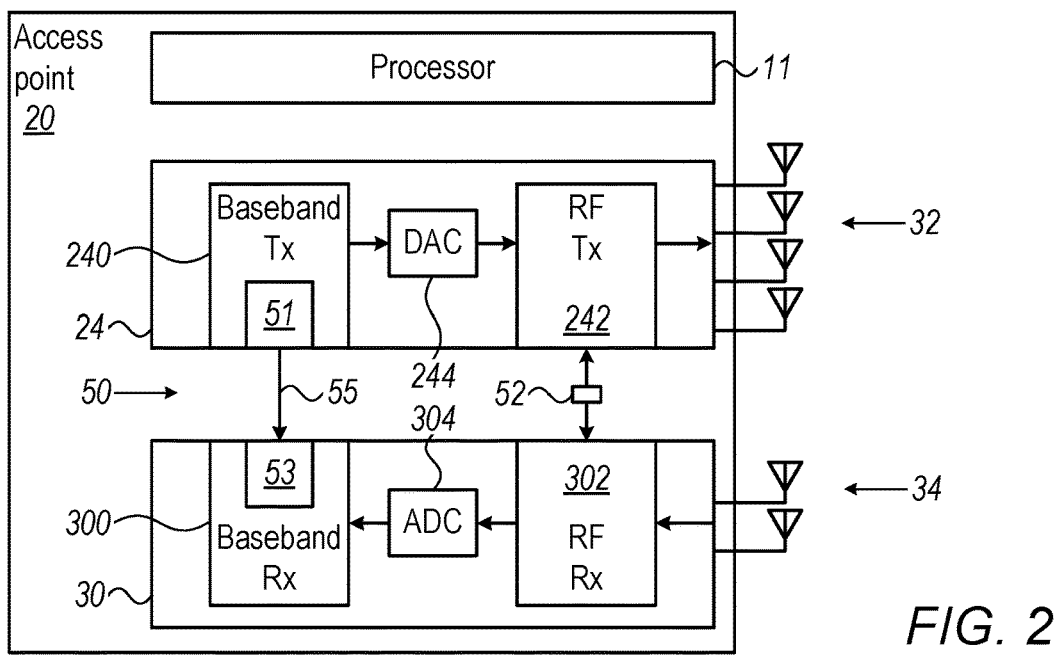
FIG. 2 is a detailed block diagram of the access point (AP) of FIG. 1 that schematically illustrates synchronization and resampling circuitries that enable Wi-Fi radar capabilities, in accordance with an embodiment that is described herein.

FIG. 2 is a detailed block diagram of access point (AP) 20 of FIG. 1 that schematically illustrates synchronization circuitries 50 and 52 that enable the Wi-Fi radar capabilities of AP 20, in accordance with an embodiment that is described herein.

In some embodiments, synchronization circuitry 50 comprises an internal interface 51 of a baseband-signal transmit circuitry 240, an electrical interface 55, and an internal interface 53 of a baseband-signal receive circuitry 300. As baseband-signal transmit circuitry 240 generates a first NDP packet of a sequence, it also generates and sends a timing-synchronization signal 45 (seen in inset 25 of FIG. 1) from internal interface 51, over electrical interface 55, to internal interface 53 of baseband-signal transmit circuitry 300.

The timing-synchronization signal enables baseband-signal receive circuitry 300 to associate each returned echo with a transmitted packet that generated the echo. The disclosed synchronization is important to spatially resolve and to estimate human positioned at a small distance from AP, for which this delay is of few nanoseconds.

Using the timing-synchronization signal, the time at which leakage tap 44 arrives at the receive circuitry can be subtracted from the time when the respective echo arrives at the receive circuitry after being reflected off a target, to estimate the target distance from AP 20. Moreover, the one-to-one identification of a transmitted sequence of packets with the respective sequence of echoes enables processor 11 of AP 20 to accurately estimate micro-Doppler signatures, as described below.

Typically, leakage tap 44 time-delay is manifested as a fixed phase offset added to a measured phase between each transmitted packet and its echo. The phase offset is removed using calibration of the leakage tap between WLAN transmitter 24 and WLAN receiver 30. The calibration of the leakage tap is performed by a digital signal processor (DSP—regarded part of processor 11) that estimates a phase of the leakage 44 for each antenna and reduces it from each of received signals, such as echoes 42.

A change in gain of either the transmit or receive circuitries may change the fixed and zeroed phase offset. Thus, in embodiments of the disclosed technique, automatic gain control (not shown) is disabled in the AP by the DSP when performing radar processing and enabled when receiving communication packets. Any gain required for the Wi-Fi radar is set by the DSP in advance in one or more of the configurable amplifiers of the AP.

As noted above, to measure very low Doppler shifts, any carrier frequency drift and/or jitter between the transmit and receive circuitries must be zeroed. In some embodiments, the zeroing of carrier frequency drift and/or jitter is achieved by driving an RF transmit circuitry 242 to an RF receive circuitry 302 with an identical carrier-frequency clock signal, using a single synchronization circuitry 52, typically by using one VCXO LO.

As further shown, a digital to analog converter (DAC) 244 converts the digital signal that baseband-signal transmit circuitry 240 outputs into an analog input for RF transmit circuitry 242, and an analog digital to converter (ADC) 304 converts the analog signal that RF receive circuitry 302 outputs into a digital input signal for baseband-signal receive circuitry 300 to analyze.

In an embodiment, synchronization circuitry 52 and RF transmission and RF reception circuitries 242 and 302 are integrated all on a same chip, which enables redistribution of the same RF clock signals among RF transmit and RF receive circuitries 242 and 300.

In an embodiment, if two (or more) nominal carrier frequencies are used, such as with a dual band AP 20, then each RF transmit and RF receive pair circuitries is fed by its own dedicated VCXO, meaning a dual band AP 20 includes two independent synchronization circuitries, such as circuitry 52. In another embodiment, a single pair of RF circuitries 242 and 300 can use two independent VCXOs with a multiplexer to select between them. This arrangement enables the AP to change the RF frequency of every given number of packets using a multiplexer circuitry in the AP.

For example, if the multiplexer is connected to five antennas, using two independent VCXOs allows at least two possible configurations of a Wi-Fi radar comprising three transmitting antennas 32 and two receiving antennas 34, or two transmitting antennas 32 and three receiving antennas 34.

The configuration of AP 20 shown in FIGS. 1 and 2 are example configurations that are chosen purely for the sake of conceptual clarity. Any other suitable configurations can be used in alternative embodiments.

Some elements of AP 20, such as the beamforming module, may be implemented in hardware, e.g., in one or more Application-Specific Integrated Circuits (ASICs) or Field-Programmable Gate Arrays (FPGAs). Additionally, or alternatively, some elements of the AP can be implemented using software, or using a combination of hardware and software elements.

In some embodiments, some of the functions of the AP, e.g., some or all the functions of processor 11, may be carried out by a general-purpose processor, which is programmed in software to carry out the functions described herein. The software may be downloaded to the processor in electronic form, over a network, for example, or it may, alternatively or additionally, be provided and/or stored on non-transitory tangible media, such as magnetic, optical, or electronic memory. Furthermore, processor 11 runs a dedicated algorithm as disclosed herein, including in FIG. 6, which enables processor 11 to perform the disclosed steps, as further described below.

Estimation of Range of Target

A typical radar sensing parameter is a delay time between the time when a WLAN packet is sent, to a time its echo is received, Δt. Knowing this value enables processor 11 of AP 20 to estimate a net delay time, τ, defined below, and using τ estimate a range to the object. Thus, for missing echo packets, processor 11 may derive interpolated values of Δt, to fill missing data points in a sequence of τ values.

Using the timing-synchronization signal, delay tap of a leakage signal is calibrated by the DSP of processor 11 to zero, meaning that a strong (0 dB) leakage signal occurs at a time T=0.

A net delay time (i.e., delay-tap-removed delay time), τ, between a time at which a packet is transmitted and its echo measured directly, yields a distance r, to a target from which the echo packet is reflected. Distance r is calculated as r=τc/2, with c being speed of light.

The ranging accuracy (e.g., resolution) is a function of the Wi-Fi bandwidth (BW) and is given by Δr=c/(2BW). For a bandwidth of 160 MHz, a coarse resolution of 94 centimeters can be obtained.

In an embodiment, processor 11 refines the accuracy of the measurement of range by using two different nominal carrier frequencies and sweeping carrier frequencies $f_{c1}$ and $f_{c2}$ about each of the nominal values to derive a set of possible ranges, $r(f_{c1})$ and $r(f_{c2})$, all of which fall within the above coarse resolution limit, Δr. The fine resolution is derived by minimizing the distance-difference between the various possible $r(f_{c1})$ and $r(f_{c2})$, i.e., by obtaining min{r $(f_{c1})-r(f_{c2})$}, and extracting a best matching common distance solution, r'.

In some embodiments, processor 11 may improve the target resolution (ranging accuracy) by applying interpolation to the estimated CIR. One example for interpolation is to apply zero padding to the channel impulse response before transforming it into time-domain CIR.

Reflections from the surroundings (e.g., walls) are much stronger than the human reflection and may well mask the human reflection unless the small human reflection is identified (e.g., against a strong background) using its micro-Doppler signature.

Furthermore, the relatively small human reflection must be identified against strong leakage signal. In an embodiment, the leakage signal is reduced, for example by 25 dB, by the DSP of processor 11 applying a nulling matrix to the channel. The nulling matrix is based on the estimated channel leakage. Using more transmitter antennas relative to the number of receive antenna can reduce a greater amplitude of the leakage signal, as more transmit antennas can create a larger destructive interference effect at the receive antenna.

Estimation of Doppler Signature of Target

Figure 3:
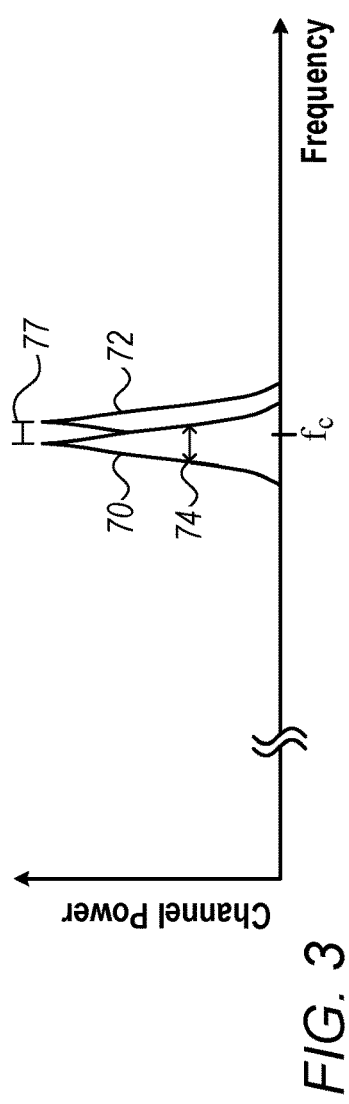
FIG. 3 is a graph that schematically shows a Doppler shift between a transmitted WLAN packet and its echo, in accordance with an embodiment that is described herein.

FIG. 3 is a graph that schematically shows a Doppler shift 77 between the Doppler spectrum 70 of a transmitted WLAN packet and the Doppler spectrum 72 of its echo, in accordance with an embodiment that is described herein. The Doppler effect is used herein in order to identify a moving target (e.g., a moving human) having a small RCS compared to its static surroundings (e.g., walls of a room) by identifying a micro-Doppler signature of the target.

The Doppler shift is indicative of a velocity component that is directed to or from AP 20 ("radial velocity"). The existence of such a velocity component of a target can be identified, and the velocity component estimated in principle, by processor 11 determining a non-zero frequency difference (i.e., Doppler shift) between the carrier-frequency of transmitted packet 70 and that of its echo packet 72.

In the disclosed Doppler shift model, $f_c$ is the carrier-frequency, which can be in the 2.4 GHz band or in the 5.5 GHz band, $V_{target}$ is the speed of the target and c is the speed of light.

The Doppler shift (77) $f_D$ is given, to a very good approximation, by $$f_D = 2f_c \frac{V_{target}}{c}.$$

For a typical target speed of 1 meter/sec, Doppler shift 77 is 40 Hz.

However, compared with a packet bandwidth 74 of few tens of MHz, the chances to detect a moving target using a single packet are very small, as the Doppler detection is required to resolve a shift with a power of $10^{-6}$. Estimation of the frequency shifted echo estimated taps over time requires using a technique such as FFT (or other technique), which requires that the echo tap estimation values are equally timed spaced.

In some embodiments, the problem of having to analyze nonequally timed spaced echoes is resolved by processor 11 performing (a) interpolations over measured echoes to derive sequences of echoes of equally spaced-in-time echo packets (i.e., derive a coherent sequence of packets), with such a sequence comprising a number N of equally spaced-in-time echo packets, typically in the range of N=1000 to N=10,000, including the interpolated packets, and (b) applying spectral analysis to coherent sequences of echoes.

Spectral analysis effectively enhances the AP 20 resolving power of the Doppler of AP 20 by a factor of approximately $10 \cdot \log_{10}(N/2)$.

Interpolating Over Nonequally Spaced-In-Time Echo Packets

Figure 4:
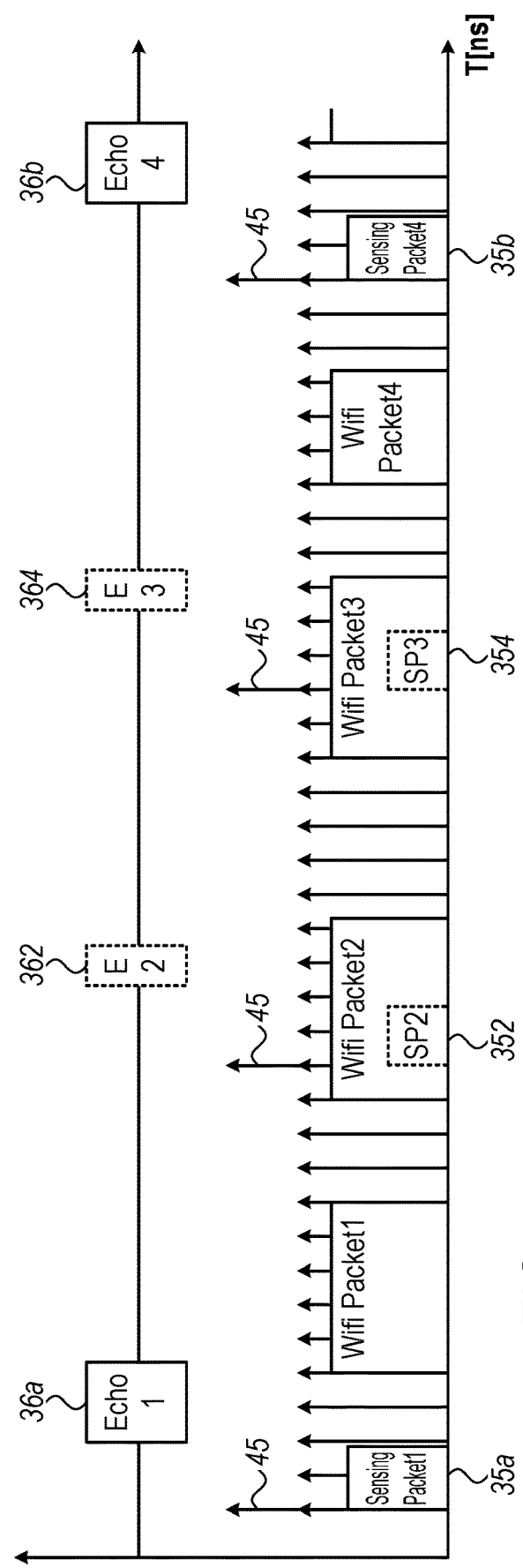
FIG. 4 is a graph that schematically shows interpolated echo packets, in accordance with an embodiment that is described herein.

FIG. 4 is a graph that schematically shows synthetic echo packets (362, 364), in accordance with an embodiment that is described herein. As seen in FIG. 4, timing-equally-spaced in time synchronization signals 45 are sent over an interface (e.g., by transmitter 24 of FIG. 1), however, in some cases, the NDP packets are not sent since the AP and the channel are busy sending Wi-fi packets for communication purposes. In the shown example, NDP packets 352 and 354 (e.g., sensing packets SP2 and SP3) are absent from the WLAN sequence.

Correspondingly, echo packets 362 and 364 are not received (e.g., by receiver 30 of FIG. 4) and are therefore absent from the respective echo sequence.

As was described above, full analysis, such as done for deriving a micro-Doppler shift, requires spectral analysis of sequences of signals of equally-spaced in time echo packets. To overcome this, processor 11 derives by interpolation synthetic echo packets 362 and 364.

In the present context, the term "synthetic echo packet" refers to an echo packet (or to one or more parameters thereof) that is generated internally in the AP. A synthetic echo packet is not received over the air and is not a result of a physical echo of any actual WLAN packet from any physical object. The term "generating a synthetic echo packet" refers to generation (e.g., by interpolation) of the actual signal of the packet, and/or of parameters of the signal such as delay, phase, frequency or other parameters.

For example, to derive synthetic packets 362 and 364 processor 11 may perform weighted averaging over sensing (e.g., NDP) packets 36a and 36b. Processor 11 gives larger weights to packets that are closer in time to synthetic echo packets (e.g., a ⅔ weight to packet 36a and ⅓ weight to packet 36b for approximating a packet 362, while a ⅓ weight to packet 36a and ⅔ weight to packet 36b for approximating a packet 364).

Once the sequence of echoes is filled with the interpolated echo packets, spectral analysis can be performed as described above.

The interpolation scheme described by way of example in FIG. 4 is brought purely for the sake of conceptual clarity. Actual interpolation may use different method. Other methods to fill for missing information may be used, such as interpolating directly over net delay times, or over measured phase differences, between NDP packets and respective echo packets.

Estimation of Direction of Target

Estimation of a direction, sin(θ), of a target relative to AP 20 is done utilizing at least part of the echo signals that are acquired for estimating range and for identifying a micro-Doppler signature. Estimation of a direction using echo signals is done by WLAN receiver 30 measuring a signal of each packet received simultaneously by two or more AP 20 antennas that form an antenna array. Methods to estimate a direction of WLAN signals using an array of antennas include the aforementioned MIMO technique. Additional methods may include using other algorithms, such as multiple signal classification (MUSIC) to distinguish or more received signals, or other existing or new algorithms for that purpose.

Simulated Wi-Fi Radar Detection Space

Figure 5:
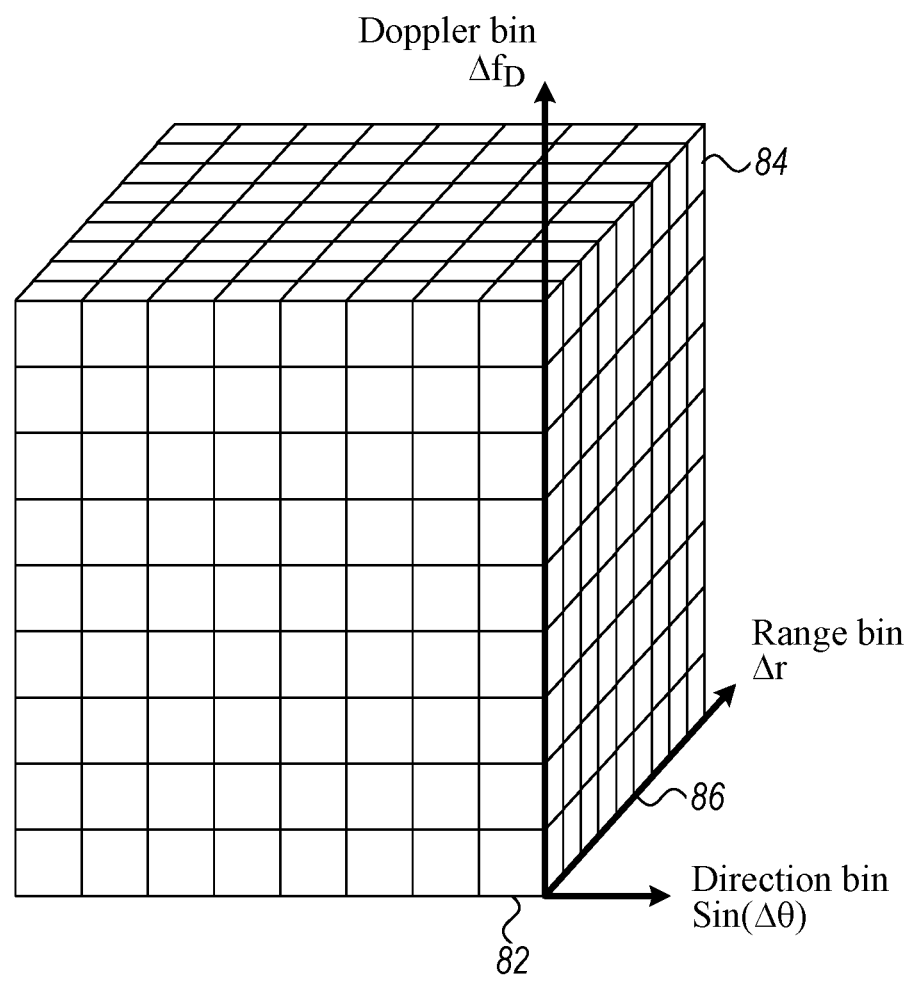
FIG. 5 is a graph the schematically illustrates a Wi-Fi radar detection space, in accordance with an embodiment that is described herein.

FIG. 5 is a graph that schematically illustrates a Wi-Fi radar detection space, in accordance with an embodiment that is described herein. As described above, AP 20 receives reflected echoes, and extracts the direction, Doppler signature, and range of reflecting objects in a designated area. Processor 11 of AP 20 organizes these in a three-dimensional matrix termed "radar detection space."

As seen, the radar detection space has three dimensions:
1. Direction (82)
2. Doppler shift (84)
3. Range (86)

In some embodiments, processor 11 searches for signal peaks inside the shown three-dimensional matrix. Each peak should be sufficiently higher than the noise, (e.g., having a signal to noise ratio (SNR) value above a prespecified SNR threshold value in dB) to be considered a possible target.

Coherent Wi-Fi Radar Detection Method

Figure 6:
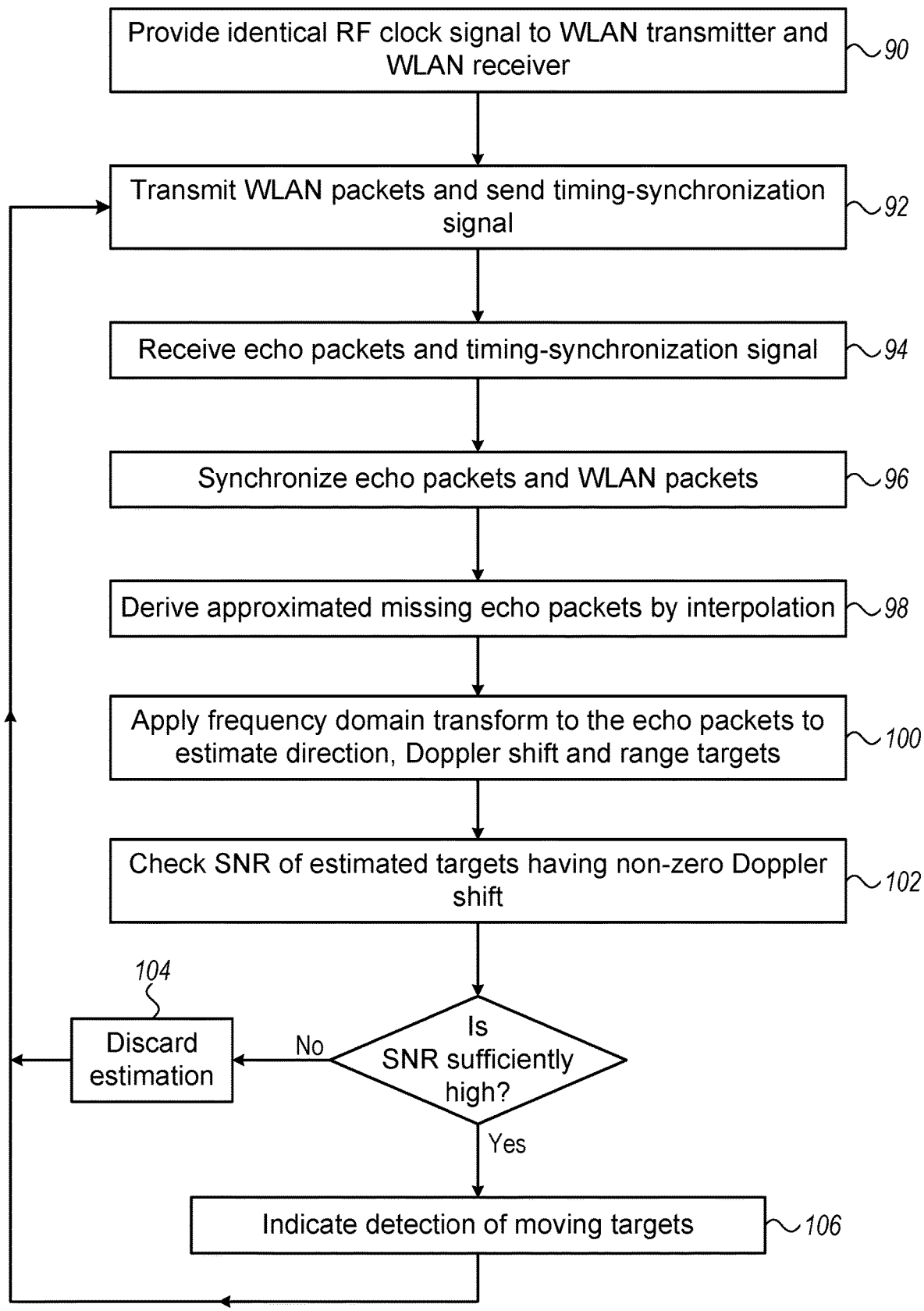
FIG. 6 is a flow chart that schematically illustrates a method for human detection using a sequence of Wi-Fi echo packets comprising interpolated echo packets, in accordance with an embodiment that is described herein.

FIG. 6 is a flow chart that schematically illustrates a method for human detection using a sequence of Wi-Fi echo packets comprising interpolated echo packets, in accordance with an embodiment that is described herein. The algorithm according to the presented embodiment carries out a process that begins with synchronization circuitry 52 of AP 20 providing identical RF clock signals (i.e., identical frequency-reference signals) to both WLAN transmitter 24 and WLAN receiver 30, at an RF clock synchronization step 90. At a packet transmission step 92, WLAN transmitter 24 transmits WLAN packets, such as a sequence of non-equally spaced-in-time NDP packets and sends a synchronization signal to WLAN receiver 30.

At an echo receiving step 94, WLAN receiver 30 receives the echo packets and the time-synchronization signal. Using the timing-synchronization signal, processor 11 of AP 20 synchronizes the echo packets with the WLAN packets, at a digital synchronization step 96.

Next at an interpolation step 98, processor 11 derives a sequence of equally spaced-in-time echo packets, by adding approximated echo packets that are missing from in the received sequence of echoes. Processor 11 may derive the approximated packets by an interpolation method like the description in FIG. 4

Next, processor 11 applies the above-described methods, such as frequency domain transforms, to estimate a direction, Doppler shift, and range of various targets, at a Wi-Fi radar detection step 100. At an SNR estimation step 102, processor 11 compares the SNR of estimated targets having a non-zero Doppler shift (e.g., a distinctive Doppler shift) to a prespecified SNR threshold value.

If the SNR is insufficiently high, the processor drops the estimation, at an estimation discarding step 104, and the process loops back step 92, to acquire and analyze a new data set comprising echo packets.

If the SNR is sufficiently high, the processor indicates the detection of one or more moving targets, at a moving target indication step 106, and the process loops back step 92, to acquire and analyze a new data set comprising echo packets. The indication may be provided by audiovisual means, for example, on a display and/or as an audio alarm.

The system and AP configurations described above are given by way of example, and any other suitable embodiments can also be used. For example, although the embodiments above refer to the use of a single AP, multiple APs can be used in order, for example, to improve coverage and accuracy.

Although the embodiments described herein mainly address _Wi-Fi sensing systems including radar combined with Wi-Fi router, the methods and systems described herein can also be used in other applications, such as in any system that is using asynchronous transmissions to estimate any object location (for example, cellular UE, or any other communication systems).

It will be thus appreciated that the embodiments described above are cited by way of example, and that the following claims are not limited to what has been particularly shown and described hereinabove. Rather, the scope includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A Wireless Local-Area Network (WLAN) access point, comprising:
    a WLAN transmitter, configured to transmit WLAN packets via one or more transmit antennas, and to send a timing-synchronization signal over an internal interface;
    a WLAN receiver, configured to receive, via one or more receive antennas, echo packets comprising reflections from an object of a selected subset of the WLAN packets transmitted by the WLAN transmitter, to receive the timing-synchronization signal from the WLAN transmitter over the internal interface, and to time-synchronize the echo packets and the corresponding WLAN packets using the timing-synchronization signal; and
    a processor, configured to:
        in response to a gap in the received echo packets, generate one or more synthetic echo packets by interpolating over two or more of the time-synchronized received echo packets, to consequently derive a sequence of equally-spaced echo packets;
        estimate one or more parameters of the object based on the WLAN packets and on the sequence of equally-spaced echo packets, including the received echo packets and the synthetic echo packets; and
        output the estimated parameters to a user.

2. The access point according to claim 1, wherein the processor is configured to generate a synthetic echo packet by (i) assigning the two or more received echo packets respective weights depending on a time difference between the two or more received echo packets and the synthetic echo packet, and (ii) interpolating over the two or more weighted received echo packets.

3. The access point according to claim 1, wherein the processor is configured to interpolate over the received echo packets by interpolating over measured net delay times between the sent WLAN packets and the respective received echo packets.

4. The access point according to claim 1, wherein the processor is configured to estimate a distance between the access point and the object by:
    for a given WLAN packet transmitted by the WLAN transmitter, identifying (i) an echo packet received from the target in response to the given WLAN packet, and (ii) a direct leakage of the given WLAN packet from the WLAN transmitter to the WLAN receiver;
    measuring a time delay between the echo packet and the direct leakage; and
    estimating the distance based on the time delay.

5. The access point according to claim 1, further comprising a frequency source configured to generate at least one frequency-reference signal, and to provide the frequency-reference signal to both the WLAN transmitter and the WLAN receiver, wherein the WLAN transmitter and the WLAN receiver are configured to frequency-synchronize to one another using the frequency-reference signal.

6. The access point according to claim 1, wherein the WLAN packets transmitted by the WLAN transmitter comprise both communication packets and channel-sounding packets, and wherein the processor is configured to estimate the parameters of the object based on the echo packets corresponding to the channel-sounding packets.

7. The access point according to claim 1, wherein the WLAN receiver is configured to receive echo packets interleaved between WLAN communication packets received from one or more WLAN stations (STAs).

8. The access point according to claim 1, wherein the one or more parameters of the object comprise at least one parameter of the object, selected from the group of parameters consisting of range, direction and velocity.

9. The access point according to claim 1, wherein the one or more parameters comprise a Doppler frequency shift of the object.

10. A method for communication in a Wireless Local-Area Network (WLAN) access point, the method comprising:
    in a WLAN transmitter of the access point, transmitting WLAN packets via one or more transmit antennas, and sending a timing-synchronization signal over an internal interface;
    in a WLAN receiver of the access point, receiving echo packets comprising reflections from an object of a selected subset of the WLAN packets transmitted by the WLAN transmitter and the timing-synchronization signal, and time-synchronizing the echo packets and the corresponding WLAN packets using the timing-synchronization signal; and
    in a processor of the access point:
        in response to a gap in the received echo packets, generating one or more synthetic echo packets by interpolating over two or more of the time-synchronized received echo packets, to consequently derive a sequence of equally-spaced echo packets;
        estimating one or more parameters of the object based on the WLAN packets and on the sequence of equally-spaced echo packets, including the received echo packets and the synthetic echo packets; and
        outputting the estimated parameters to a user.

11. The method according to claim 10, wherein generating a synthetic echo packet comprises (i) assigning the two or more received echo packets respective weights depending on a time difference between the two or more received echo packets and the synthetic echo packet, and (ii) interpolating over the two or more weighted received echo packets.

12. The method according to claim 10, wherein interpolating over the received echo packets comprises interpolating over measured net delay times between the sent WLAN packets and the respective received echo packets.

13. The method according to claim 10, comprising estimating a distance between the access point and the object, by:
    for a given WLAN packet transmitted by the WLAN transmitter, identifying (i) an echo packet received from the target in response to the given WLAN packet, and (ii) a direct leakage of the given WLAN packet from the WLAN transmitter to the WLAN receiver;
    measuring a time delay between the echo packet and the direct leakage; and
    estimating the distance based on the time delay.

14. The method according to claim 10, further comprising, using a frequency source, generating at least one frequency-reference signal, providing the frequency-reference signal to both the WLAN transmitter and the WLAN receiver, and frequency-synchronizing the WLAN transmitter and the WLAN receiver to one another using the frequency-reference signal.

15. The method according to claim 10, wherein the WLAN packets transmitted by the WLAN transmitter comprise both communication packets and channel-sounding packets, and wherein estimating the parameters of the object is performed based on the echo packets corresponding to the channel-sounding packets.

16. The method according to claim 10, wherein receiving the echo packets comprises receiving the echo packets interleaved between WLAN communication packets received from one or more WLAN stations (STAs).

17. The method according to claim 10, wherein the one or more parameters of the object comprise at least one parameter of the object, selected from the group of parameters consisting of range, direction and velocity.

18. The method according to claim 10, wherein the one or more parameters comprise a Doppler frequency shift of the object.

* * * * *